United States Patent
Yoshitsugu et al.

(10) Patent No.: US 6,787,954 B2
(45) Date of Patent: Sep. 7, 2004

(54) SPINDLE MOTOR

(75) Inventors: Takao Yoshitsugu, Tottori (JP); Shoichi Yoshikawa, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/144,038

(22) Filed: May 14, 2002

(65) Prior Publication Data

US 2002/0175577 A1 Nov. 28, 2002

(30) Foreign Application Priority Data

May 22, 2001 (JP) ........................................ 2001-152067

(51) Int. Cl.⁷ .............................................. H02K 5/167
(52) U.S. Cl. ..................... 310/90; 384/132; 384/133; 310/67 R; 360/98.07; 360/99.08
(58) Field of Search ........................ 310/90, 90.5, 67 R; 384/133, 99, 107, 132; 360/98.07, 99.04, 99.08, 99.09, 99.11

(56) References Cited

U.S. PATENT DOCUMENTS

| | | | | |
|---|---|---|---|---|
| 4,797,009 A | * | 1/1989 | Yamazaki | 384/100 |
| 4,938,611 A | * | 7/1990 | Nii et al. | 384/133 |
| 5,358,339 A | * | 10/1994 | Konno et al. | 384/107 |
| 5,372,432 A | * | 12/1994 | Ishikawa | 384/133 |
| 5,667,308 A | * | 9/1997 | Nose et al. | 384/99 |
| 5,667,309 A | * | 9/1997 | Nose | 384/132 |
| 5,791,785 A | | 8/1998 | Nose et al. | 384/119 |
| RE36,202 E | * | 4/1999 | Hajec | 310/90 |
| 5,914,832 A | * | 6/1999 | Teshima | 360/98.07 |
| 6,176,618 B1 | * | 1/2001 | Kawawada et al. | 384/107 |
| 6,316,857 B1 | * | 11/2001 | Jeong | 310/90 |
| 6,417,590 B1 | * | 7/2002 | Komura et al. | 310/90.5 |
| 2002/0130571 A1 | * | 9/2002 | Kodama | 310/90 |

FOREIGN PATENT DOCUMENTS

| | | |
|---|---|---|
| JP | 10-80091 | 3/1998 |
| JP | 2000-113582 | 4/2000 |
| JP | 2000-121986 | 4/2000 |
| JP | 2000-215589 | 8/2000 |
| JP | 2001-103707 | 4/2001 |
| JP | 2002-054636 | 2/2002 |

* cited by examiner

Primary Examiner—Tran Nguyen
Assistant Examiner—Leda T. Pham
(74) Attorney, Agent, or Firm—Wenderoth, Lind & Ponack, L.L.P.

(57) ABSTRACT

A downsized spindle motor of excellent abrasion and shock resistance is provided. A shaft is fit into a sleeve. A flange is fixed to an end of the shaft. A radial bearing is formed on faces of the shaft and the sleeve, which faces are opposite and close to each other. A face of the flange closely faces a face of a thrust plate, thereby forming a thrust bearing. Another face of the thrust plate is caulked with a tip of the sleeve. The tip of the sleeve and the thrust plate are fixed to each other by an adhesive. A tapering section is provided at an upper end of the sleeve.

44 Claims, 6 Drawing Sheets

SPINDLE MOTOR

FIELD OF THE INVENTION

The present invention relates to a spindle motor to be mounted to, for example, a hard disc drive, an optical disk drive, a magneto-optical disc drive, a magnetic disc drive or a polygon mirror.

BACKGROUND OF THE INVENTION

Various kinds of spindle motors are available in the market, and thus a key component of these spindle motors, i.e., a fluid bearing device, is of many types. Many of the fluid bearing devices include a cylindrical sleeve, which bears a load of a shaft in a radial direction. The sleeve surrounds the shaft via an annular space between an outer wall of the shaft and an inner wall of the sleeve. This space is called "a radial bearing space" and is filled with lubricant. When a rotor-hub fixedly mounted to a first end of the shaft rotates, hydrodynamic-pressure generating grooves (e.g. herringbone grooves) generate dynamic pressure in the lubricant, so that a radial bearing is formed. The grooves are provided on the outer wall of the shaft and the inner wall of the sleeve.

A disc-shaped thrust plate is fixed to a second end of the shaft, and herringbone grooves, for instance, are provided on at least one of an upper face or a lower face of the thrust plate. Lubricant is filled into these grooves, so that a thrust bearing is formed in order to bear a load in an axial direction.

A spindle motor and bearing device as discussed above is disclosed in Japanese Patent Application Non-examined Publication No. 2000-113582 (hereinafter called "prior art 1"). Prior art 1 teaches the following points in order to prevent lubricant from splashing out from bearings: (a) A slope flaring downwardly in an axial direction is provided on an outer wall of a supporting member, namely, the sleeve. (b) A slope is provided at an upper end of the supporting member so that a space of a thrust bearing flares outwardly in a radial direction. This space is called a thrust bearing space. (c) Oil repellent made of fluorine-based material is applied to a tapering-sealed section in order to prevent oil-migration, i.e., lubricant such as oil, from leaking out from the bearings.

Japanese Patent Application Non-examined Publication No. 2000-121986 (prior art 2) discloses an idea that lubricant in a radial bearing space is steadily retained, which prevents the lubricant from splashing out or leaking out of the bearing space. In other words, an annular recess is provided on an inner wall of a sleeve, and the recess has a slope flaring toward an opening of the sleeve. FIG. 6 of prior art 2 illustrates that a conical section 103c is provided at an opening end of sleeve 103, and conical section 103c has a slope recessed from an outer wall to the inner wall. When shaft 102 is inserted into sleeve 103 in assembling the motor, even if lubricant overflows from a bearing space, the overflowed lubricant flows back to the space along this conical section 103c provided at an end face of sleeve 103. This structure prevents the lubricant from splashing out from the bearing space.

Both of prior art 1 and prior art 2 disclose an idea of preventing lubricant from leaking out. Prior art 1 discloses that the slope is provided on an outer wall of the sleeve, and the slope flares downwardly in the axial direction in order to prevent lubricant from splashing out. Indeed, this structure prevents lubricant, retained in the thrust bearing space, from splashing out; however, prior art 1 does not disclose anything about problems and their solutions with regard to filling lubricant into a thrust bearing space.

Prior art 2 raises a problem that lubricant overflows when a shaft is inserted into a sleeve while assembling a spindle motor, and proposes a solution in that a slope is provided at an end face of the sleeve. However, according to prior art 2, surplus lubricant is preferably prepared before assembly because prior art 2 refers to a method of inserting a shaft into a sleeve in which lubricant is filled.

SUMMARY OF THE INVENTION

The present invention aims to provide a spindle motor that comprises the following elements:

(a) a shaft;
(b) a flange fixedly mounted to a first end of the shaft and having a diameter greater than that of the shaft;
(c) a cylindrical sleeve to be fit to the shaft;
(d) a radial bearing space is to be formed between an outer wall of the shaft and an inner wall of the sleeve, which is opposite and close to the outer wall of the shaft;
(e) a rotor hub fixed to a second end of the shaft and facing an upper end of the sleeve;
(f) a thrust plate disposed close to and opposite the flange;
(g) a thrust bearing space formed between faces of the flange and the thrust plate which are close to and opposite each other;
(h) lubricant retained in the thrust bearing space; and
(i) a tapering section provided at an upper end of the sleeve.

This structure allows a thrust bearing to bear an axial load of the shaft, because the flange has a diameter greater than that of the shaft, and the thrust bearing is disposed between the faces of the flange and the thrust plate which are close to each other. Further, because the tapering section is provided at the upper end of the sleeve, a sufficient amount of lubricant to be filled into the radial bearing space can be stored. The construction discussed above restrains the lubricant from splashing or leaking out from the sleeve, and lowers pressure applied to the lubricant so that bubbles do not occur in the lubricant. As a result, a spindle motor having a longer service life is obtainable.

BRIEF DESCRIPTION OF THE DRAWINGS is a sectional view of an essential part of a spindle motor in accordance with a first exemplary embodiment of the present invention.

Figure 5A:
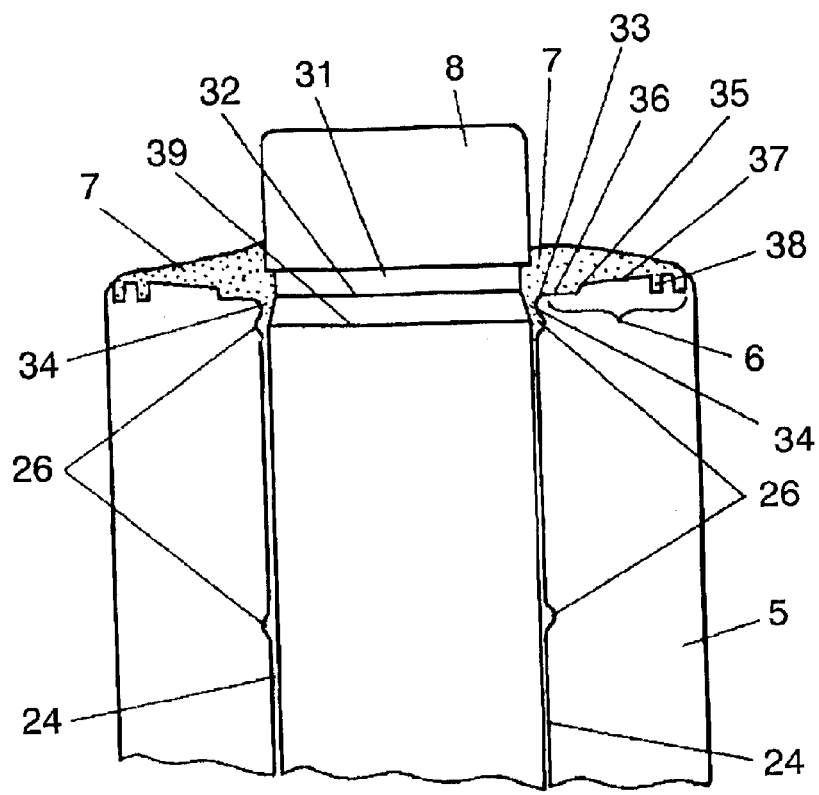
Figure 5B:
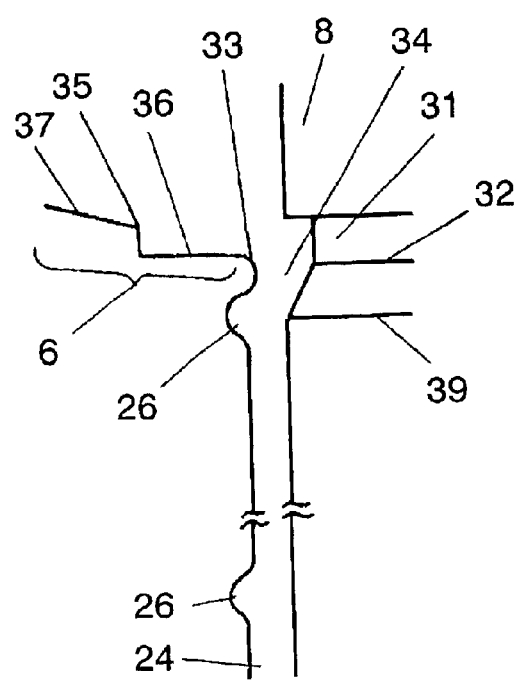

FIG. 5(A) and FIG. 5(B) illustrate a tapering section of a spindle motor in accordance with a fifth exemplary embodiment of the present invention.

Figure 6:
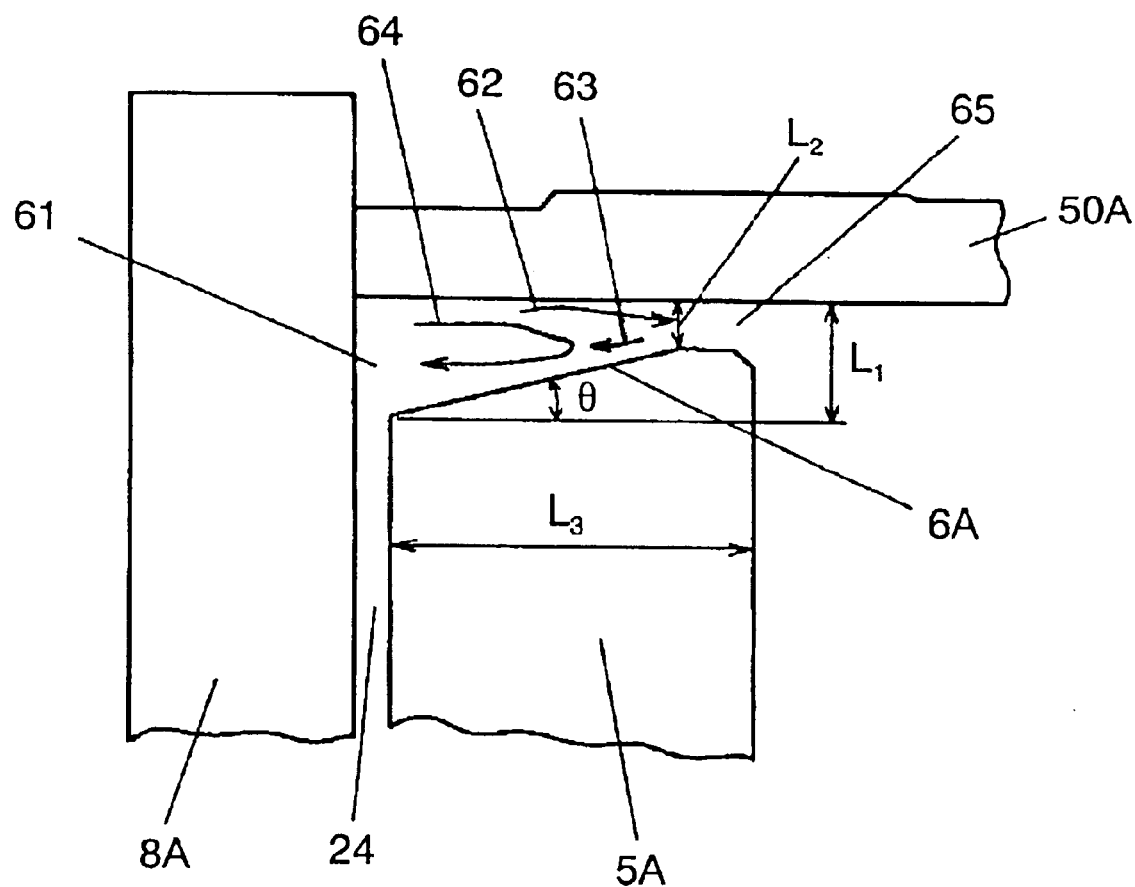

FIG. 6 illustrates a tapering section of the spindle motor in accordance with the fifth exemplary embodiment of the present invention.

DETAILED DESCRIPTION OF THE EXEMPLARY EMBODIMENTS

First Exemplary Embodiment

Figure 1:
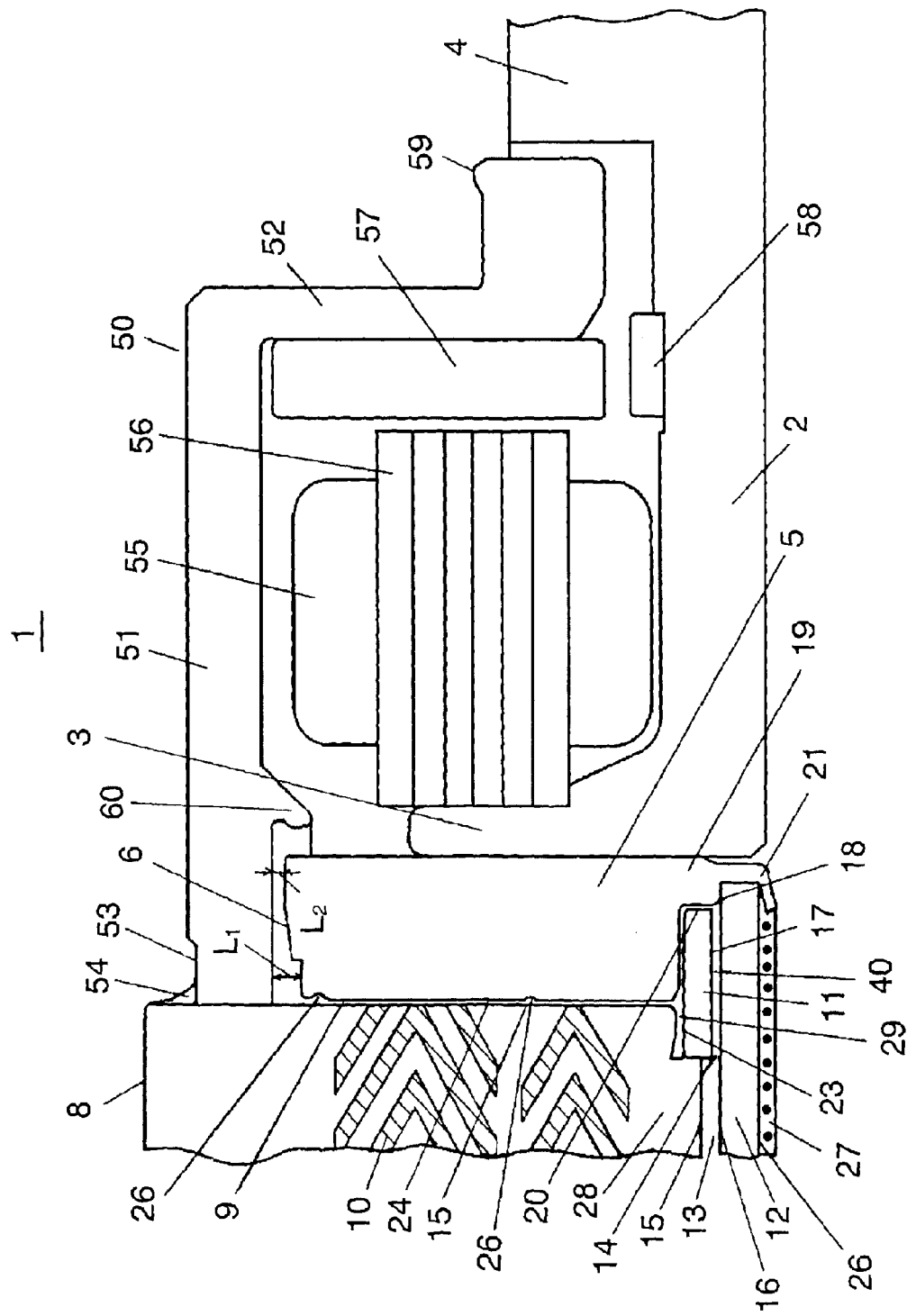

FIG. 1 is a sectional view of an essential part of a spindle motor in accordance with a first exemplary embodiment of the present invention. Spindle motor 1 includes inner cylinder 3 and outer cylinder 4 respectively on an inner wall and an outer wall of base member 2, which is made of, e.g., die-cast aluminum. Sleeve 5 is provided at an inner wall of inner cylinder 3. Sleeve 5 is of a shape that is substantially cylindrical, and is made of brass plated with nickel. Tapering section 6 is provided at an upper end of sleeve 5, where an upper end surrounds an opening of sleeve 5 and faces a lower face of rotor hub 50 which is mounted to shaft 8. Adhesive is applied to an outer wall of sleeve 5, which is then inserted into inner cylinder 3 of base member 2. Sleeve 5 is thus fixed to inner cylinder 3. At the upper end (surrounding the opening), tapering section 6 is provided. On inner wall 9 of sleeve 5, for instance, two lubricant reservoirs 26 are provided.

Tapering section 6 is inclinded upwardly from an inner side to an outer side of sleeve 5, i.e., from a side of shaft 8 to a side of inner cylinder 3. This structure maximizes distance L1 between shoulder 51 and an inner section of sleeve 5, and minimizes distance L2 between shoulder 51 and an outer section of sleeve 5. This structure produces air-flow at an upper end of sleeve 5 against a force which splashes or leaks lubricant along the upward incline of tapering section 6, so that the lubricant is prevented from splashing or leaking out.

In this first embodiment, a shape of the upper end of sleeve 5 is varied, and distances between rotor hub 50 and sleeve 5 are determined according to these variations; however, parts of rotor hub 50 can be changed in shape, instead of varying these distances. Alternatively, both of sleeve 5 and hub 50 can be changed in shape, so that air-flow can be produced. The air-flow will be detailed in the fifth exemplary embodiment.

At least one of outer wall of shaft 8 or inner wall of sleeve 9 has, e.g., herringbone grooves 10. In this first embodiment, herringbone grooves 10 are provided to the outer wall of shaft 8. A face of shaft 8, on which herringbone grooves 10 are formed, and a corresponding inner face of sleeve 5 form radial bearing space 24, which is a part of a radial bearing. Herringbone grooves 10 are filled with lubricant such as oil. Grooves 10 with the lubricant work as a fluid bearing and generate dynamic pressure in a radial direction when shaft 8 rotates.

Disc-shaped metal unit 11 (flange) is welded by a laser to a first axial end of shaft 8. Flange 11 is, for instance, a hollow disc and made of stainless steel SUS4202J2. Flange 11 has a diameter greater than that of shaft 8, and a ring-shaped metal unit, of which a central part is hollowed out, can also be used as flange 11. In the first embodiment, ring shaped flange is employed. Face 17 of flange 11 closely faces face 16 of thrust plate 12. At least one of face 16 and face 17 has, e.g., herringbone grooves, thereby forming a thrust bearing, which bears an axial load of shaft 8.

In this specification, when it is not needed to distinguish the radial bearing space from thrust bearing space, a general expression of "bearing space" is used.

Shaft 8 comprises two sections, a first section having a smaller diameter and a second section having a larger diameter. The first section can be formed by providing a protrusion or a recess on an end of shaft 8. In other words, shaft 8 is not a uniform cylinder, but an end of shaft 8 has a non-flat face. Flange 11 also has a non-flat face which fits into the non-flat face of shaft 8. Accordingly, flange 11 preferably has a recess, protrusion or hollow section 13, so that flange 11 can be fit to the end of shaft 8 with ease. In FIG. 1, shaft 8 has protrusion 28 as the first section having a smaller diameter, and flange 11 has hollow section 13.

FIG. 1 is a sectional view of an essential part of a spindle motor in accordance with the first exemplary embodiment of the present invention. In FIG. 1, a left side of shaft 8 is omitted, because the spindle motor is substantially symmetrical with respect to shaft 8.

One advantage of the spindle motor of the present invention is that shaft 8 has protrusion 28, which provides shaft 8 with a larger diameter and a smaller diameter. Protrusion 28 having the smaller diameter is inserted into hollow section 13 of flange 11, and a contact section between flange 11 and protrusion 28 is welded by a laser, so that laser-welded section 14 is formed. This welding forms reservoir 29 between protrusion 28 and another face 23 of flange 11. A part of reservoir 29 is closed by the laser welding discussed above, which tightly closes reservoir 29.

Figure 2:
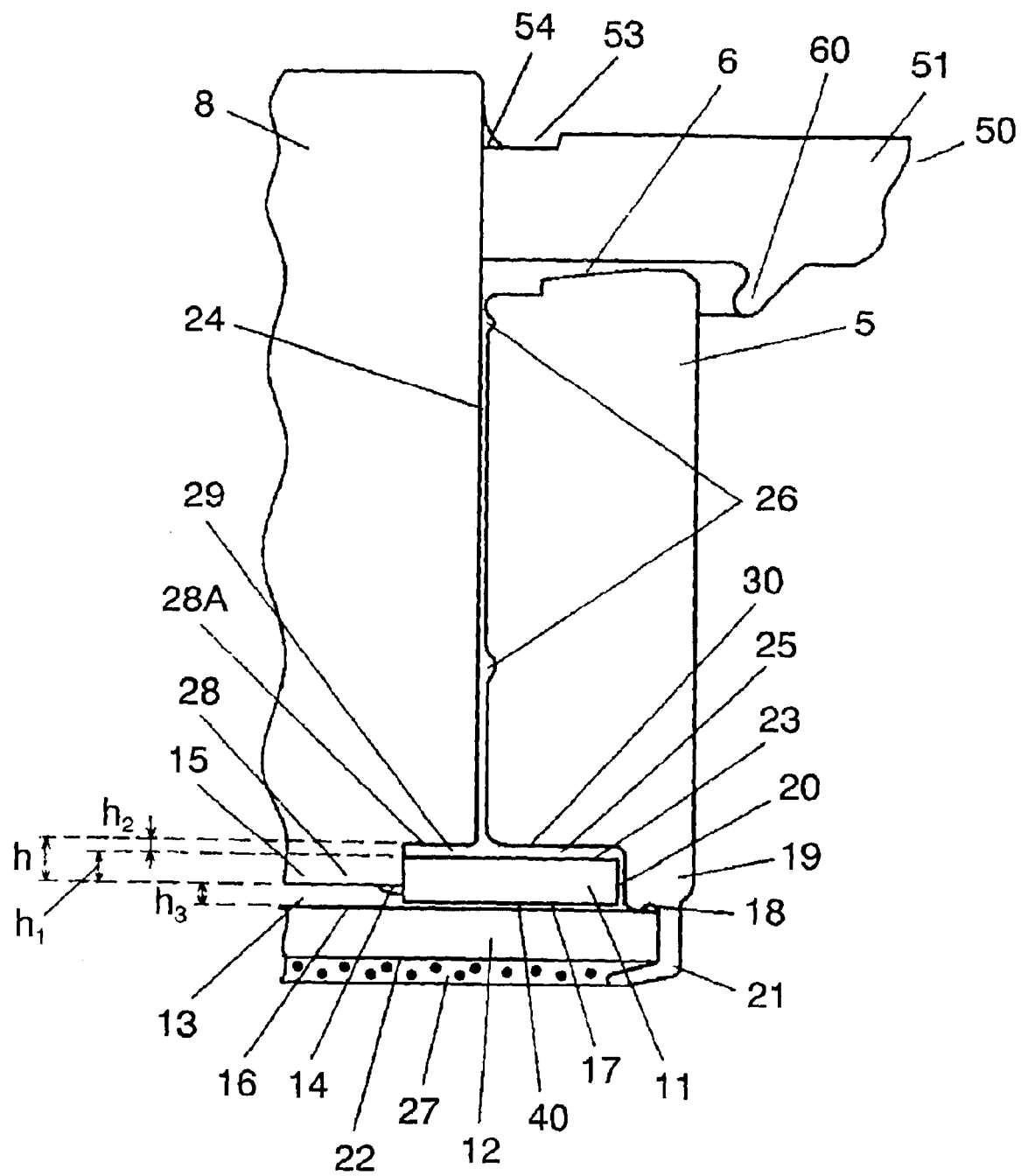
FIG. 2 is an enlarged view of a part of the spindle motor shown in FIG. 1.

As shown in FIG. 2, a fine clearance is formed between shoulder 30 of sleeve 5 and another face 23 of flange 11. This fine clearance leads lubricant into thrust bearing space 40, which is formed between face 17 of flange 11 and a corresponding part of face 16 of thrust plate 12.

If end face 15 of protrusion 28 is carefully inserted into hollow section 13 so as not to contact face 16 of thrust plate 12, hollow section 13 is not completely closed, but remains as a hollow section.

When shaft 8 is inserted into hollow section 13 prepared at an approximate center of flange 11, a recess is formed in hollow section 13. This recess can be used to define laser-welded section 14. Hollow section 13 provides a margin for performing welding as well as a vacant space for reserving lubricant. The spindle motor can thus be downsized.

Thrust plate 12 and flange 11 work together to form the thrust bearing which bears the axial load of shaft 8. These two elements can be used as a sealing member of a so called "one-side sealed spindle motor" as shown in FIG. 1. This utilization of the two elements can simplify motor structure.

Peripheral section 18 is provided at an outer circumference of disc-shaped thrust plate 12. At peripheral section 18, flange 11 is not closely opposite thrust plate 12. This structure is also an advantage of the present invention. A diameter of thrust plate 12 is greater than that of flange 11, so that peripheral section 18 can be formed. Peripheral section 18 is useful for arm section 19 of sleeve 5 to closely face side wall 20 of flange 11 as well as face 16 of thrust plate 12. This structure allows sleeve 5 to firmly surround flange 11, and allows sleeve 5 to firmly hold thrust plate 12. Tip section 21 extends from arm section 19 of sleeve 5, and is bent toward another face 22, i.e., a rear face, of thrust plate 12 and then caulked. A caulked section is fixed by applying adhesive, thereby increasing mechanical strength such as shock resistance.

As shown in FIG. 1, on another axial end of shaft 8, i.e., an end having a larger diameter, rotor hub 50 is fixed. Hub 50 comprises disc-shaped shoulder 51 and arm 52 depending from an outer rim of shoulder 51. Oil fence 60 is provided on a part of shoulder 51. Oil fence 60 prevents lubricant from splashing out from sleeve 5. Indention 53 of approximately 0.1 mm depth is provided around shaft 8 at a mounting location thereof. Laser welding is applied to a contact spot between shaft 8 and indentation 53, thereby forming laser welded section 54.

Cup-shaped section 59 is provided on arm 52, and cup-shaped section 59 can fixedly hold a disc or the like (not shown). On an inner wall of arm 52, cylindrical magnet 57, which is N pole and S pole alternately magnetized, is fixed.

Stator core 56 wound with coil 55 is mounted, close to magnet 57, on a part of base member 2. Attracting plate 58 is disposed on another part of base member 2, so that plate 58 faces magnet 57. Attracting plate 58 is made of material having little iron loss, e.g., iron-nickel alloy. Magnet 57 and attracting plate 58 magnetically attract each other, and therefore, even if the spindle motor is used at any angle, elements thereof are always retained in normal places. In other words, sleeve 5, thrust plate 12, stator core 56, shaft 8, rotor hub 50 and the like can be firmly retained at predetermined locations.

When coil 55 is powered, magnetic field is produced at a salient pole of stator core 56, and torque is generated between stator core 56 and magnet 57 facing stator 56, thereby rotating rotor hub 50. A hard disc (not shown) clamped by rotor hub 50 thus rotates. Rotation of hub 50 entails shaft 8 fixed to hub 50, as well as flange 11 fixed to shaft 8, to also rotate. This allows lubricant and the herringbone grooves to produce dynamic pressure, so that the spindle motor works.

Second Exemplary Embodiment

FIG. 2 is an enlarged view of a part of the spindle motor shown in FIG. 1, and particularly details a fitting relationship between shaft 8 and sleeve 5, and enlarges an end of shaft 8. Herringbone grooves 10 shown in FIG. 1 are omitted in order to simplify FIG. 2. Elements similar to those in FIG. 2 have the same reference marks.

Shaft 8 including protrusion 28 has two sections, a first section having a larger diameter and the second section, i.e., protrusion 28, having a smaller diameter. Thickness "t" of flange 11 is at least equal to height "h" of protrusion 28, i.e., $h \leq t$. This relationship can form hollow section 13 between protrusion 28 and thrust plate 12, and form reservoir 29 between protrusion 28 and flange 11. The importance of this relationship can be clarified by assuming a relationship of $h > t$, which is opposite to $h \leq t$. If the relationship of $h > t$ were established, tip 15 of protrusion 28 could contat face 16 of thrust plate 12. When shaft 8 is carefully inserted into hollow section 13 of flange 11 so as not to contact face 16, reservoir 29 becomes unnecessarily large and tends to trap bubbles. Reservoir 29, which is space formed between protrusion 28 and face 23 of flange 11, does not work well as a lubricant reservoir. Shock resistance also lowers because of this space becoming larger.

In the second embodiment, dimensions of critical elements are prepared as follows:

height of protrusion 28: h=0.35 mm, thickness of flange 11: t=0.50 mm, and fitted depth of protrusion 28 into hollow section 13: h1=0.25 mm.

According to these dimensions, height of reservoir 29: h2=h-(t-h1), and height of hollow section 13: h3=(t-h1). In this embodiment, the height of reservoir 29: h2=0.10 mm, or 100 μm, and the height of hollow section 13: h3=0.25 mm, or 250 μm.

In the spindle motor of the present invention, height "h" of protrusion 28, thickness "t" of flange 11, and fitted depth "h1" of the protrusion 28 relative to flange 11 are predetermined, and accordingly, the height "h2" of reservoir 29 and the height "h3" of hollow section 13 can be determined as given sizes.

Reservoir 29 can be formed by arranging shaft 8, sleeve 5 and flange 11, namely, these three elements are respectively of predetermined forms and located such that the three elements face closely each other, so that three spaces are created. One of these spaces is closed by performing laser welding, so that reservoir 29 is created. In other words, lubricant supplied via radial bearing space 24, which is formed between shaft 8 and sleeve 5, runs into face 23 of flange 11 and branches into space 25 and reservoir 29. One of these branches is stopped by laser welded section 14. Reservoir 29 by virtue of laser welded section 14 is tightly closed; thus lubricant hardly leaks out from, and mechanical strength of, reservoir 29 increases.

Space 25 leads lubricant into thrust bearing space 40 formed between face 17 of flange 11 and face 16 of thrust plate 12, and it also specifies an axial movable range of shaft 8 as well as of rotor hub 50. Size of space 25 can be arbitrarily determined based on height and shape of shoulder 30 of sleeve 5. Height of space 25 is preferably set at not less than 0.005 mm and not more than 0.05 mm.

Presence of reservoir 29 is useful for adjusting an overall height of the spindle motor, and effective for absorbing dimensional dispersion of shaft 8.

Third Exemplary Embodiment

Figure 3:
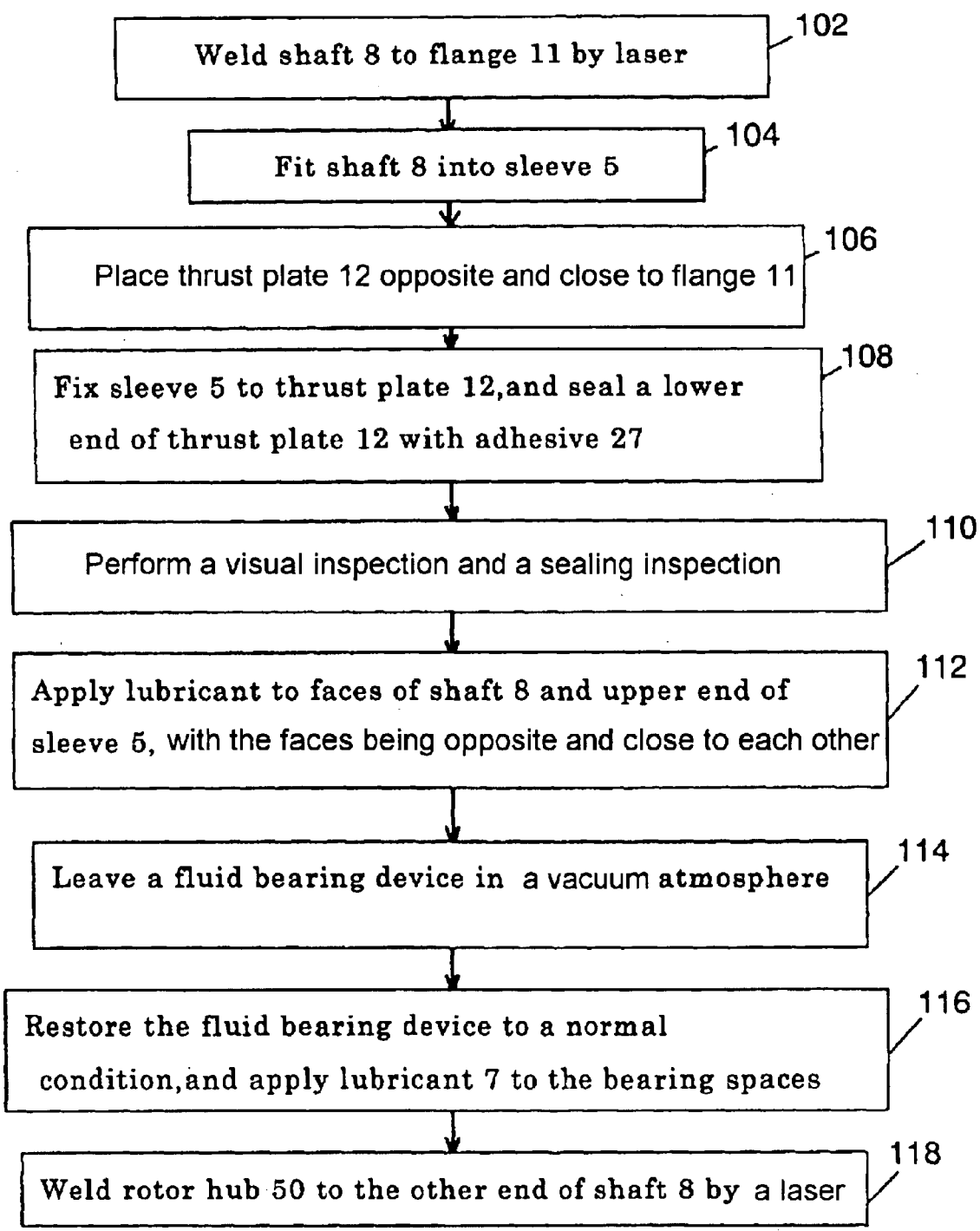
FIG. 3 shows steps of manufacturing a spindle motor in accordance with a third exemplary embodiment of the present invention.

FIG. 3 shows steps of manufacturing a spindle motor in accordance with a third exemplary embodiment of the present invention. According to method 100 of assembly spindle motor 1 of the present invention, flange 11 is fixed to a first end of shaft 8 by laser welding, as shown in step 102, so that flange 11 is integrated with shaft 8. Flange 11 has a diameter larger than that of shaft 8.

Step 104 shows that shaft 8 is fit into sleeve 5. A second end of shaft 8 is inserted into sleeve 5, with the second end being an end other than the first end where flange 11 is fixed, so that shaft 8 is fit to sleeve 5. As a result, an outer wall of shaft 8 faces inner wall 9 of sleeve 5 via a fine annular space. This fine space has a width of several μm and forms radial bearing space 24 which bears a radial load of shaft 8.

Step 106 shows that thrust plate 12 closely faces flange 11. Face 16 of thrust plate 12 is closely placed opposite to face 17 of flange 11. These two faces, facing each other, form a thrust bearing which bears an axial load of shaft 8. Because thrust plate 12 has a larger diameter than that of flange 11, peripheral section 18 is formed on plate 12, and peripheral section 18 does not face flange 11.

Step 108 shows that thrust plate 12 is fixed to sleeve 5, thereby sealing a lower end of sleeve 5. Arm 19 of sleeve 5 is on a peripheral section 18 which does not face flange 11, so that an outer rim of disc-shaped flange 11 is surrounded by cylindrical sleeve 5. Locations of sleeve 5, flange 11 and shaft 8 are thus steadily fixed. Tip section 21 extending from arm 19 is caulked with rear face 22 of thrust plate 12, and adhesive 27 is applied on rear face 22 for sealing.

Step 110 shows that a visual inspection and a sealing inspection are performed. During the visual inspection, shapes and displacements of thrust plate 12 and sleeve 5 are inspected. Thrust plate 12 is utilized as a sealing member of the spindle motor. During the sealing inspection, airtightness of these elements is tested, thus an air-leak tester is preferably used.

Step 112 shows that lubricant is applied to a place where shaft 8 faces an upper end of sleeve 5. Simple composition oil disclosed in Japanese Patent Application Non-Examined Publication No. 2000-179552 can be used as the lubricant. Substance including magnetic fluid disclosed in Japanese Patent Application Non-Examined Publication No. H08-259982 can be also used as the lubricant.

Figure 4:
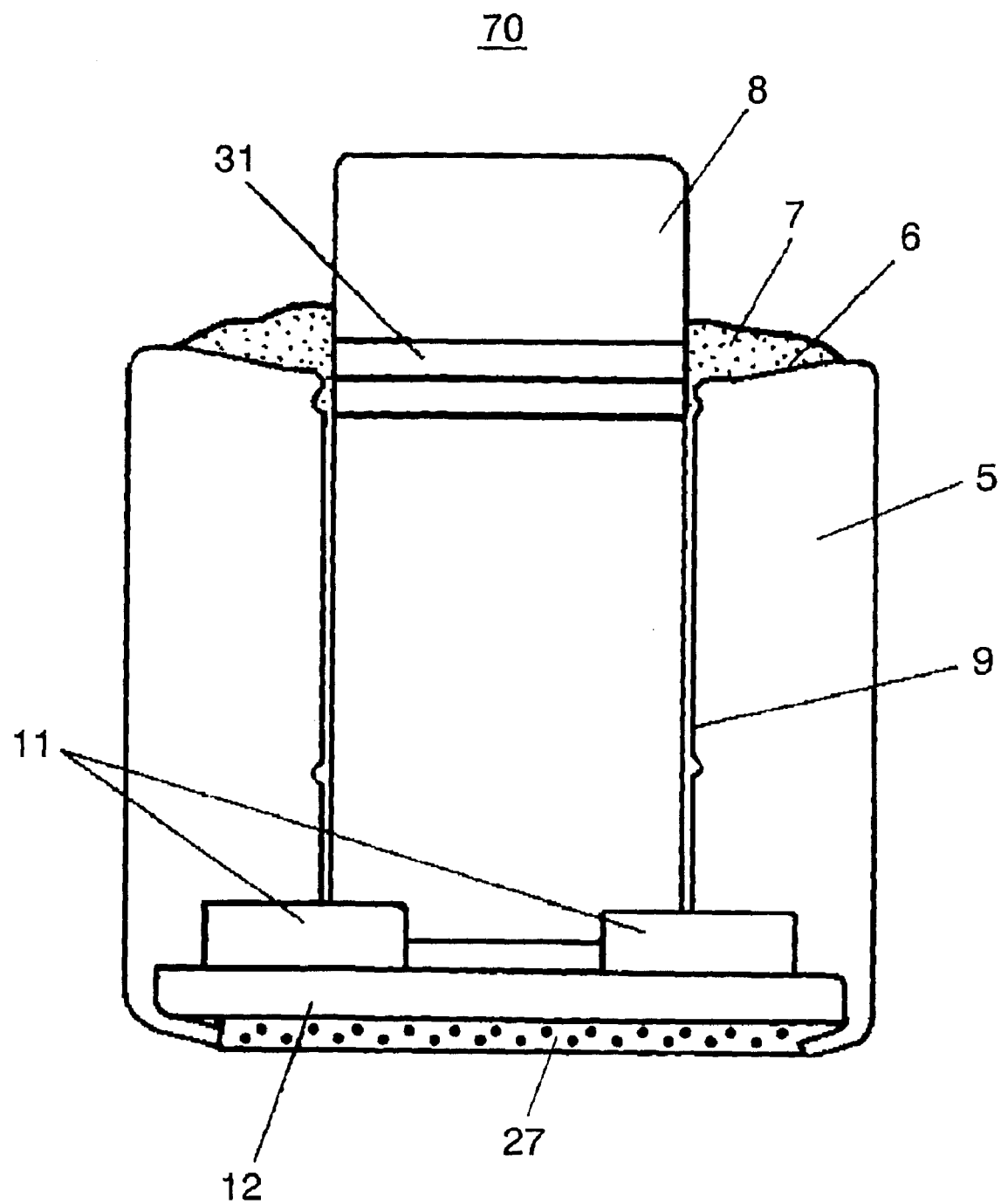
FIG. 4 illustrates an intermediate style of a spindle motor in accordance with a fourth exemplary embodiment of the present invention.

Step 114 shows that fluid bearing device 70, later shown in FIG. 4, is left in a vacuum atmosphere. In other words, shaft 8, sleeve 5, flange 11, thrust plate 12 and adhesive 27, which fixes tip section 21 of sleeve 5 to thrust plate 12, are exposed in a vacuum. Fluid bearing device 70 is a semi-finished product of the spindle motor, and yet, it is a key component of the motor. Fluid bearing device 70 is left in, e.g., a vacuum chamber having a degree of vacuum not more than 100 Torr.

Step 116 shows that fluid bearing device 70 left in the vacuum is restored to a normal condition. At this moment, pressure difference occurs between atmospheric pressure and vacuum in bearing spaces, so that lubricant is filled into the bearing spaces.

Step 118 finally shows that rotor hub 50 is welded to an end of shaft 8 by a laser. Hub 50 includes shoulder 51 and arm 52, and is substantially disc-shaped. A hole (not shown) is punched at a center of hub 50, and shaft 8 is fit into this hole.

Indentation 53 is provided near the center of hole 50 into which shaft 8 is fit. Indentation 53 and shaft 8 are welded by a laser at a spot where both of these elements contact each other, and laser welded section 54 is formed. Presence of indentation 53 eliminates a margin for welding, and therefore, the spindle motor can be downsized. Indentation 53 is also used as a defining section for specifying a place to be welded, so that laser welded section 54 can be provided exactly at a predetermined place.

FIG. 3 shows essential steps for completing the spindle motor; however, those steps do not cover all the steps. For instance, a step of fitting sleeve 5 to base member 2, and a step of fixing stator core 56 and attracting plate 58 to base member 2 are needed for completing the spindle motor, but these steps are omitted from FIG. 3. A part of the assembly procedure can be changed, and another step can be added based on a designing request.

Fourth Exemplary Embodiment

FIG. 4 illustrates a fluid bearing device, a key component of a spindle motor, in accordance with a fourth exemplary embodiment of the present invention. When step 112 shown in FIG. 3 is completed, fluid bearing device 70 is completed. Fluid bearing device 70 is distinguished from spindle motor 1, because sleeve 5 is not yet fit into base member 2, or rotor hub 50 is not yet fixed to an end of shaft 8 in device 70.

In fluid bearing device 70, a first face of flange 11 is fixed to a first end of shaft 8, and a second face of flange 11 closely faces a first face of thrust plate 12. A second face of thrust plate 12 is caulked with tip section 21 of sleeve 5. Adhesive 27 is applied to a place where second face 22 of thrust plate 12 closely faces tip section 21, so that this place is fixed and sealed. Further, lubricant is applied to tapering section 6 and its vicinity, where sleeve 5 closely faces shaft 8. Fluid bearing device 70 discussed above is an intermediate style of a spindle motor before the spindle motor is completed. Indeed, device 70 is the intermediate style; however, this fluid bearing device 70 can be treated as one component. This is one advantages of the present invention.

A function test of fluid bearing device 70 includes, for instance, visual inspections on sleeve 5 and thrust plate 12 with regard to shape and displacement, and an air-leak test with regard to air-tightness. Since the spindle motor is separated into some units, e.g., a fluid bearing device, these inspections and test can be performed with ease. Because no lubricant is handled during a test stage, an air-leak tester and other apparatuses are kept free from contamination.

Oil repellent applied to tapering section 6 lowers surface tension of lubricant, so that the oil repellent is useful to restrain the lubricant from splashing out from sleeve 5. The oil repellent makes it easier to eliminate lubricant leaking out to an upper end of sleeve 5.

Fluid bearing device 70 does not necessarily require tapering section 6 on sleeve 5. An advantage of the fourth embodiment does not exist in a method of fitting shaft 8 into sleeve 5 whose inner wall 9 is pre-applied with lubricant, but does exist in a method of fitting shaft 8 into sleeve 5 before lubricant is applied to inner wall 9 of sleeve 5. Therefore, according to this method, an amount of lubricant that is expected to overflow when shaft 8 is inserted into sleeve 5 can be saved. In FIG. 4, shaft-tapering 31 is provided to a part of shaft 8. This will be detailed in a fifth embodiment.

Fifth Exemplary Embodiment

FIGS. 5A, 5B and FIG. 6 illustrate appropriate shapes of shaft 8 and an upper end of sleeve 5 for realizing an objective of the present invention. FIG. 5A illustrates a condition where the upper end of sleeve 5 is applied with lubricant 7, and FIG. 5B shows an enlarged view of tapering section 6 and a part of shaft 8 near tapering section 6. FIG. 6 illustrates how tapering section 6 operates.

As shown In FIG. 5A, shaft-tapering 31, including a conical face followed by a cylindrical face, is provided on shaft 8. Centeral section 32 of shaft-tapering 31 substantially corresponds to end section 33 of tapering section 6 provided at the upper end of sleeve 5. This structure can provide a rather large space near end section 33 of tapering section 6.

Space around end section 33 of tapering section 6 functions as an outlet for supplying or filling lubricant smoothly into radial bearing space 24 and thrust bearing space 40. Thus a given space is preferably reserved around end section 33 for functioning well as an outlet. Shaft-tapering 31 provided on shaft 8 enlarges some space for the outlet and further smoothens supply or filling of lubricant.

Shaft-tapering 31 together with tapering section 6 of sleeve 5 forms wider-path 34, and thus, a space where lubricant 7 is retained increases. Therefore, pressure applied to lubricant is reduced, which restrains bubbles from occurring. The space around end section 33 of tapering section 6, i.e., the outlet, is preferably not enlarged, because enlargement would incur splash-out of lubricant from sleeve 5. However, end section 33 protrudes toward centeral section 32 of shaft-tapering 31, and this structure does not invite such inconvenience.

End section 33 of tapering section 6 faces reservoir 26 formed on inner wall 9 of sleeve 5 via radial bearing space 24. This structure allows a user to supply or fill lubricant smoothly from tapering section 6 into reservoir 26, which assists the lubricant in flowing from tapering section 6 smoothly into radial bearing space 24 and thrust bearing space 40. This structure also reduces pressure applied to the lubricant, and restrains bubbles from occurring in the lubricant.

As shown in FIG. 5B, reservoir 26 is a V-shaped recess, and end 39 of shaft-tapering 31 corresponds to a bottom of the V-shaped recess. In other words, shaft-tapering 31 and reservoir 26 are positioned such that end 39 corresponds to a bottom of reservoir 26, whereby wider path 34 is closed but rather extends from the vicinity of end section 33 of tapering section 6 to reservoir 26 while maintaining approximately a constant width. This structure allows a user to supply or fill lubricant smoothly into the bearing spaces. Lubricant around shaft-tapering 31 is supplied to end 39 by centrifugal force and moves to radial bearing space 24. If the lubricant splashes out, reservoir 26 accommodates it. Shaft-tapering 31 is not necessarily formed of a conical face and cylindrical face. Reservoir 26 does not necessarily have a V-shaped recess. However, it is essential that a part of shaft-tapering 31 is opposite to a part of reservoir 26 via radial bearing space 24.

Another reservoir 26 is prepared around a center of sleeve 5, and therefore, even if air enters into the bearing spaces, a given amount of lubricant can be retained in a space above a center of flange 11 and the bearing spaces.

Further, step 35 is provided at tapering section 6 in a thickness direction. Step 35 separates tapering section 6 into first tapering face 36 and second tapering face 37. Recess 38 is provided at a part of tapering section 6. Recess 38 can be treated as a tapering face such as first and second tapering faces 36, 37.

Step 35 defines a border between two areas, one area being applied with oil repellent and another not being applied with oil repellent. Step 35 also blocks the oil repellent from entering into radial bearing space 24 via end section 33, and works as a fence which blocks lubricant from splashing out from sleeve 5. Recess 38 saves an amount of lubricant 7 that is expected to overflow tapering-section 6 to outside of sleeve 5.

In this fifth embodiment, tapering section 6 is constructed of step 35, first tapering face 36, second tapering section 37 and recess 38. However, each individual element is not necessarily tapered, and the overall structure can be tapered instead. For instance, if first tapering face 36, provided at inner side of sleeve 5, is changed to a substantially flat face, face 36 together with step 35 works well as a reservoir for supplying or filling lubricant into radial bearing space 24 and thrust bearing space 40. A shape, a number and a depth of recess 38 can be determined considering an overall size of spindle motor 1 or a size of tapering section 6.

FIG. 6 illustrates advantages of tapering section 6A, which is similar to the tapering section 6 shown in FIG. 1 and FIG. 5A. For convenience of simple description, step 35, first and second tapering faces 36, 37, and recess 38 are omitted from FIG. 6. An overall tapering section constructed of these elements is denoted by reference mark 6A. Shaft 8 and rotor hub 50 are the same as those shown in FIG. 1 and FIG. 5A; however, they are denoted by reference marks 8A, 50A for correspondance with tapering section 6A.

In FIG. 6, rotor hub 50A is fixed to an end of shaft 8A at a right angle. An upper end of sleeve 5A, rotor hub 50A and shaft 8A create space 61, which is defined by shapes and sizes of these three elements.

Space 61 communicates with one space and one void, the one space being radial bearing space 24 and the one void being outer void 65 disposed on an outer side of sleeve 5A. Outer void 65 works as an outlet/inlet of air from/to space 61, whereby air is taken into space 61 via outer void 65 and discharged from space 61 to outside of sleeve 5A.

A shape and a size of space 61 formed by shaft 8A and rotor hub 50A, both of which are positioned orthogonally relative to each other, are defined by tapering section 6A. An upper end of sleeve 5A flares from an inner side to an outer side, and distance between tapering section 6A and rotor hub 50A tapers from the inner side to the outer side, i.e., distance L1 is larger than distance L2. These distances are determined responsive to a size of spindle motor 1. For instance, L1 is set at 0.3 mm and L2 is set at 0.1 mm. Thickness of sleeve 5A, i.e., distance L3 from an inner wall to the outer wall of sleeve 5, is set at, for instance, 1.7 mm.

When shaft 8A and rotor hub 50A rotate, centrifugal force produces air-flow in space 61. Air travels toward outer side of sleeve 5A because an outer-rim speed of sleeve 5A is greater than an inner-rim speed thereof. However, presence of tapering section 6A changes air-flow. To be more specific, outgoing air-flow 62 flowing from the inner side to the outer side of sleeve 5, and incoming air-flow 63 flowing from the outer side to the inner side of sleeve 5 are produced. These air-flows produce circular air-flow 64 in space 61.

Production and power of circular air-flow 64 in space 61 depend on wind power generated by motor rotation, distances L1, L2 at the upper end of sleeve 5A, and inclination angle θ of tapering section 6A. For instance, if distance L2 is increased, air incomes/outgoes smoothly to/from space 61; however, this increase of L2 seriously influences production of circular air-flow 64. In particular, when outgoing volume of air becomes greater, production of circular air-flow 64 is prevented. Although an r.p.m. of the motor and a diameter of space 61 have some influence, distance L2 is 1 mm at most, and preferably not more than 0.2 mm. In the present invention, distances L1, L2, and inclination angle θ are set at predetermined values in order to produce circular air-flow 64.

Direction of incoming air-flow 63 works as a preventer against lubricant, which is oozed out of radial bearing space 24, from splashing out from sleeve 5A. This preventive force is influenced by inclination angle e, and if this angle becomes smaller, a force pushing oozed lubricant back to the inner side of sleeve 5A is weakened. If this angle becomes larger, an active area of radial bearing space 24 becomes inconveniently smaller. Therefore, if a user needs a radial bearing having a predetermined capability, the user has to admit that the spindle motor becomes slightly larger.

Numbers of experiments were carried out under several conditions discussed above, and the following appropriate condition was found. Inner diameter of the rotor hub is 30 mm, and an r.p.m. of the spindle motor is around 40,000. Under this condition, tapering section 6A works well as a preventer and results in an excellent sealing effect at an inclination angle θ of around 5 degrees. In other words, tapering section 6A with inclination angle θ of around 5 degrees practically blocks lubricant from splashing out or leaking out. Further, application of oil repellent to tapering section 6A lowers surface tension, so that a blocking effect increases remarkably. To be more specific, if force of incoming air-flow 63 is not more than 2 μN, tapering section 6A can substantially push lubricant back to the inner side of sleeve 5A.

The description hereinbefore proves that the present invention can provide a thrust bearing which can substantially bear an axial load of a shaft because a flange, having a larger diameter than that of the shaft, is provided. The thrust bearing is located between the flange and a thrust plate opposite and close to the flange. A tapering section is provided on an upper end of a sleeve, and the tapering section blocks lubricant from splashing out or leaking out from the sleeve.

A distance between the tapering section and a rotor hub is narrowed along a radial direction from an inner side to an outer side of the sleeve. This structure produces incoming air-flow directed to the inner side of the sleeve along a face of the rotor hub opposite to the sleeve, so that lubricant is blocked from oozing out inconveniently onto a face of the rotor hub. Another taper is provided to the shaft at a place such that the tapering section on the sleeve is actually widened. Therefore, enough space is prepared for applying lubricant, and pressure applied to the lubricant is lowered, which prevents bubbles from occurring and supplies the lubricant to a reservoir in a substantial amount.

Since the flange has a larger diameter than that of the shaft, a thrust bearing, which can substantially bear an axial load of the shaft, is constructed. The thrust bearing is located between the flange and the thrust plate that is opposite and close to the flange. The tapering section on the upper end of the sleeve reserves a space large enough for storing lubricant to be filled into a bearing space, and prevents the lubricant from leaking out from the sleeve.

A nearly closed space is formed between the rotor hub and the upper end of the sleeve. Incoming air-flow directed to the inner side of the sleeve is thus generated, which blocks lubricant from leaking, or splashing out from the inner side to the outer side of the sleeve.

Circular air-flow can be produced in the space discussed above, and the circular air-flow flows against a splashing direction (inside to outside) of lubricant. The circular air-flow thus restrains lubricant from leaking out or splashing out from the inner side to the outer side of the sleeve.

Lubricant travels along the tapering section upwardly for leaking or splashing out from the sleeve; however, air-flow against this movement is produced at the upper end of the sleeve. This air-flow pushes the lubricant back to the inner side, and prevents the lubricant from splashing out.

Oil repellent lowers surface tension, and therefore, application of oil repellent to the tapering section can restrain the lubricant from leaking or splashing out from the sleeve, even if an air-flow force toward the inner side is not sufficient for preventing the lubricant from leaking or splashing out from the sleeve. Because the oil repellent repels lubricant, even if surplus lubricant spreads out, it can be wiped off with ease.

A step provided in the tapering section defines a border between two areas, one being applied with oil repellent and the other which is not. The step also works as a fence which prevents the oil repellent from entering into a radial bearing space and a thrust bearing space.

The step also assists lubricant to flow smoothly into a reservoir from the tapering section. Shaft-tapering supplements a function of the tapering section provided on the upper end of the sleeve. To be more specific, the tapering section on the upper end of the sleeve works as a reservoir which supplies or fills lubricant into the radial bearing space and the thrust bearing space. If an inclination angle of the tapering section is small, the tapering section does not function well as the reservoir. In such a case, the shaft-tapering supplements the function of the tapering section as reservoir. When a taper is prepared on a part of the shaft, a space for retaining the lubricant is enlarged. Thus, a pressure applied to lubricant decreases, which restrains bubbles from occurring.

The shaft-tapering communicates with the reservoir provided at the inner side of the sleeve with an approximate constant width therebetween, and therefore, a space for retaining lubricant is enlarged. As a result, lubricant can be supplied smoothly to bearing spaces, and pressure applied to the lubricant decreases, thereby restraining bubbles from occurring.

A space extending from an upper end of the sleeve to the reservoir is not closed, but remains wide, and therefore, lubricant can be supplied or filled smoothly into the radial bearing space and the thrust bearing space.

Advantages of the present invention discussed above are, in short, to save surplus supplement of lubricant and to prevent gas from occurring in the lubricant. As a result, a spindle motor of a longer service life is obtainable, which contributes much to the industry.

What is claimed is:

1. A spindle motor comprising: a shaft;
    a flange fixed to a first axial end of said shaft and having a diameter greater than that of said shaft;
    a cylindrical sleeve to which said shaft is fit, said sleeve having a tapering section at an upper end portion of said sleeve, said tapering section being inclined generally upwardly and outwardly in a direction from an inner surface of said sleeve toward an outer surface of said sleeve, and said tapering section having a dimension in a radial direction of said sleeve that is greater than a dimension of said tapering section in an axial direction of said shaft;
    a radial bearing space defined between said inner surface of said sleeve and an outer surface of said shaft;
    a rotor hub fixed to a second axial end of said shaft and disposed opposite to said upper end portion of said sleeve;
    a thrust plate disposed opposite said flange; and
    a thrust bearing space defined between an upper surface of said thrust plate and a lower surface of said flange, wherein
    lubricant is to be retained in said thrust bearing space.

2. The spindle motor according to claim 1, wherein said tapering section is inclined generally upwardly and outwardly in the direction from said inner surface of said sleeve toward said outer surface of said sleeve such that an axial distance between said rotor hub and said tapering section lessens in a direction from said inner surface of said sleeve toward said outer surface of said sleeve.

3. The spindle motor according to claim 2, wherein said shaft, said rotor hub and said upper end portion of said sleeve cooperate with one another to define a space, and wherein said axial distance between said rotor hub and said tapering section lessens in the direction from said inner surface of said sleeve toward said outer surface of said sleeve such that said space becomes smaller in the direction from said inner surface of said sleeve toward said outer surface of said sleeve.

4. The spindle motor according to claim 2, further comprising oil repellent on said tapering section.

5. The spindle motor according to claim 2, wherein said tapering section includes a step.

6. The spindle motor according to claim 5, wherein
    said tapering section includes a first portion extending from said inner surface of said sleeve to a position intermediate said inner surface and said outer surface of said sleeve, and also includes a second portion extending between said position and said outer surface of said sleeve, and
    said step is positioned between said first portion and said second portion.

7. The spindle motor according to claim 6, wherein said first portion is not inclined.

8. The spindle motor according to claim 2, further comprising a path near an end of said tapering section, said path being wider than said radial bearing space so as to function as a lubricant reservoir.

9. The spindle motor according to claim 2, wherein said outer surface of said shaft is tapered near an end of said tapering section.

10. The spindle motor according to claim 2, further comprising:
    a path on said inner surface of said sleeve near an end of said tapering section, said path being wider than said radial bearing space so as to function as a lubricant reservoir,
    wherein a portion of said outer surface of said shaft is tapered near the end of said tapering section such that an axial position of the lubricant reservoir generally corresponds to an axial position of the tapered portion of said outer surface of said shaft and is separated therefrom by said radial bearing space.

11. The spindle motor according to claim 1, wherein said shaft, said rotor hub and said upper end portion of said sleeve cooperate with one another to define a space that becomes smaller in the direction from said inner surface of said sleeve toward said outer surface of said sleeve.

12. The spindle motor according to claim 11, wherein said space is arranged to have created therein an air flow which is directed in a direction from said inner surface of said sleeve toward said outer surface of said sleeve and in a direction from said outer surface of said sleeve toward said inner surface of said sleeve.

13. The spindle motor according to claim 12, wherein said space is arranged such that when the air flow is directed in the direction from said outer surface of said sleeve toward said inner surface of said sleeve said air flow is directed downwardly along said tapering section.

14. The spindle motor according to claim 13, further comprising an oil repellant applied to said tapering section.

15. The spindle motor according to claim 12, further comprising an oil repellant applied to said tapering section.

16. The spindle motor according to claim 11, further comprising an oil repellant applied to said tapering section.

17. The spindle motor according to claim 1, further comprising an oil repellant applied to said tapering section.

18. The spindle motor according to claim 1, wherein said tapering section includes a step.

19. The spindle motor according to claim 18, wherein
said tapering section includes a first portion extending from said inner surface of said sleeve to a position intermediate said inner surface and said outer surface of said sleeve, and also includes a second portion extending between said position and said outer surface of said sleeve, and
said step is positioned between said first portion and said second portion.

20. The spindle motor according to claim 19, wherein said first portion is not inclined.

21. The spindle motor according to claim 1, further comprising a path near an end of said tapering section, said path being wider than said radial bearing space so as to function as a lubricant reservoir.

22. The spindle motor according to claim 1, wherein said outer surface of said shaft is tapered near an end of said tapering section.

23. The spindle motor according to claim 1, further comprising:
a path on said inner surface of said sleeve near an end of said tapering section, said path being wider than said radial bearing space so as to function as a lubricant reservoir,
wherein a portion of said outer surface of said shaft is tapered near the end of said tapering section such that an axial position of the lubricant reservoir generally corresponds to an axial position of the tapered portion of said outer surface of said shaft and is separated therefrom by said radial bearing space.

24. The spindle motor according to claim 23, wherein said tapered portion of said outer surface of said shaft is opposite the lubricant reservoir.

25. The spindle motor according to claim 1, wherein said tapering section is inclined generally upwardly and outwardly in the direction from said inner surface of said sleeve toward said outer surface of said sleeve at an angle of about 5° relative to a plane that is transverse to said shaft and between said first and second axial ends of said shaft.

26. The spindle motor according to claim 1, wherein said sleeve has a width extending from said inner surface of said sleeve to said outer surface of said sleeve, and said tapering section is inclined generally upwardly and outwardly in a direction from said inner surface of said sleeve toward said outer surface of said sleeve for at least half of said width of said sleeve.

27. The spindle motor according to claim 26, wherein said tapering section is inclined generally upwardly and outwardly in the direction from said inner surface of said sleeve toward said outer surface of said sleeve at an angle of about 5° relative to a plane that is transverse to said shaft and between said first and second axial ends of said shaft.

28. The spindle motor according to claim 27, wherein said tapering section includes a step.

29. The spindle motor according to claim 28, wherein
said tapering section includes a first portion extending from said inner surface of said sleeve to a position intermediate said inner surface and said outer surface of said sleeve, and also includes a second portion extending between said position and said outer surface of said sleeve, and
said step is positioned between said first portion and said second portion.

30. The spindle motor according to claim 29, wherein said first portion is not inclined.

31. The spindle motor according to claim 26, wherein said tapering section includes a step.

32. The spindle motor according to claimer 31, wherein
said tapering section includes a first portion extending from said inner surface of said sleeve to a position intermediate said inner surface and said outer surface of said sleeve, and also includes a second portion extending between said position and said outer surface of said sleeve, and
said step is positioned between said first portion and said second portion.

33. The spindle motor according to claim 32, wherein said first portion is not inclined.

34. The spindle motor according to claim 25, wherein said tapering section includes a step.

35. The spindle motor according to claim 34, wherein
said tapering section includes a first portion extending from said inner surface of said sleeve to a position intermediate said inner surface and said outer surface of said sleeve, and also includes a second portion extending between said position and said outer surface of said sleeve, and
said step is positioned between said first portion and said second portion.

36. The spindle motor according to claim 35, wherein said first portion is not inclined.

37. The spindle motor according to claim 1, wherein a space defined by said tapering section, said shaft and said rotor hub has a dimension in said radial direction of said sleeve that is greater than a dimension of said space in said axial direction of said shaft.

38. The spindle motor according to claim 37, wherein said tapering section includes a step.

39. The spindle motor according to claim 38, wherein
said tapering section includes a first portion extending from said inner surface of said sleeve to a position intermediate said inner surface and said outer surface of said sleeve, and also includes a second portion extending between said position and said outer surface of said sleeve, and
said step is positioned between said first portion and said second portion.

40. The spindle motor according to claim 39, wherein said first portion is not inclined.

41. A spindle motor comprising:

a shaft;

a flange fixed to a first axial end of said shaft and having a diameter greater than that of said shaft;

a cylindrical sleeve to which said shaft is fit, said sleeve having a tapering section at an upper end portion of said sleeve, said tapering section being inclined generally upwardly and outwardly in a direction from an inner surface of said sleeve toward an outer surface of said sleeve at an angle of about 5° relative to a plane that is transverse to said shaft and between said first and second axial ends of said shaft;

a radial bearing space defined between said inner surface of said sleeve and an outer surface of said shaft;

a rotor hub fixed to a second axial end of said shaft and disposed opposite to said upper end portion of said sleeve;

a thrust plate disposed opposite said flange; and a thrust bearing space defined between an upper surface of said thrust plate and a lower surface of said flange, wherein lubricant is to be retained in said thrust bearing space.

42. The spindle motor according to claim 41, wherein said sleeve has a width extending from said inner surface of said sleeve to said outer surface of said sleeve, and said tapering section is inclined generally upwardly and outwardly in a direction from said inner surface of said sleeve toward said outer surface of said sleeve for at least half of said width of said sleeve.

43. The spindle motor according to claim 42, wherein said tapering section includes a step.

44. The spindle motor according to claim 41, wherein said tapering section includes a step.

* * * * *